No. 816,159. PATENTED MAR. 27, 1906.
R. L. ERVIN.
WHEEL GAGE.
APPLICATION FILED SEPT. 8, 1905.
2 SHEETS—SHEET 1.
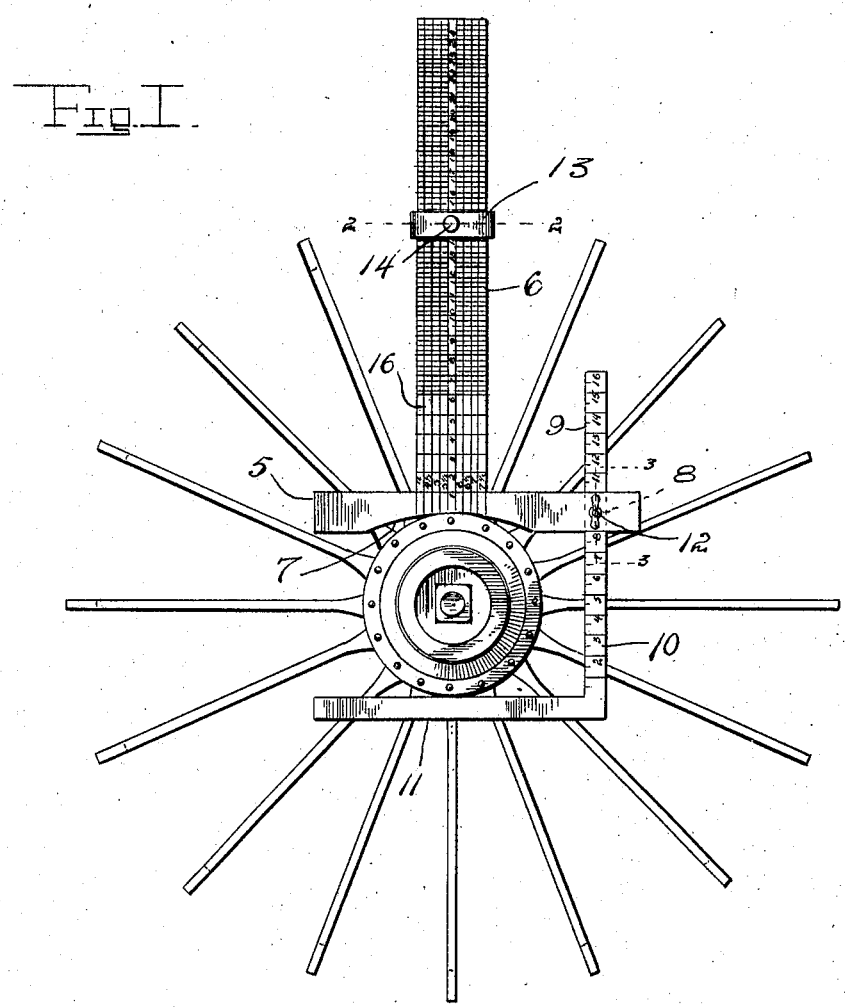
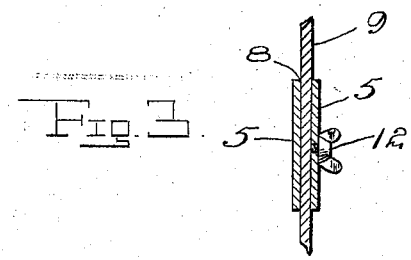

No. 816,159. PATENTED MAR. 27, 1906.
R. L. ERVIN.
WHEEL GAGE.
APPLICATION FILED SEPT. 8, 1905.
2 SHEETS—SHEET 2.
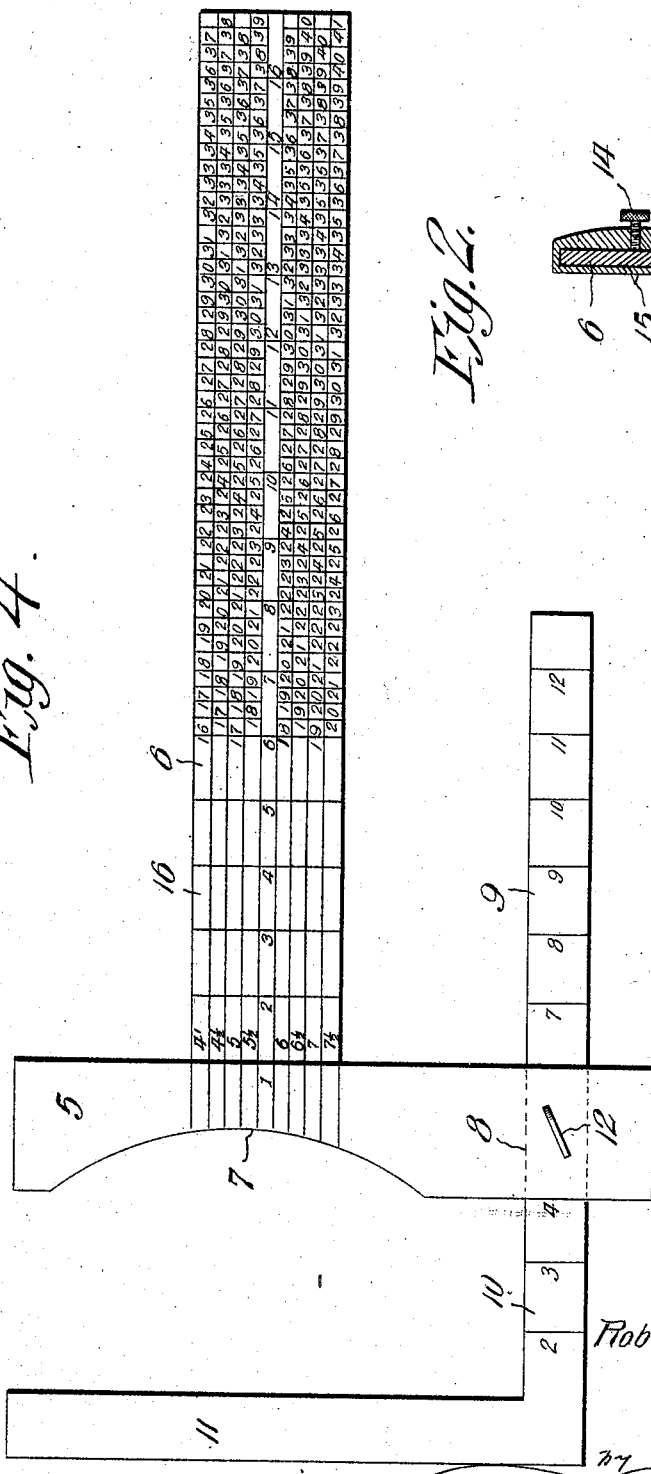
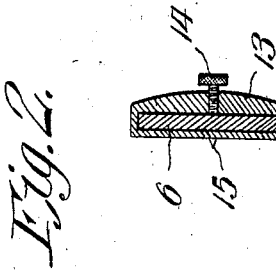
Witnesses
T. W. Riley.
E. M. Colford
Inventor
Robert L. Ervin.
by
Chandlee & Chandlee
Attorneys

UNITED STATES PATENT OFFICE.

ROBERT L. ERVIN, OF PRINCETON, KENTUCKY.

WHEEL-GAGE.

No. 816,159.   Specification of Letters Patent.   Patented March 27, 1906.

Application filed September 8, 1905. Serial No. 277,584.

*To all whom it may concern:*

Be it known that I, ROBERT L. ERVIN, a citizen of the United States, residing at Princeton, in the county of Caldwell, State of Kentucky, have invented certain new and useful Improvements in Wheel-Gages; and I do hereby declare the following to be a full, clear, and exact description of the invention, such as will enable others skilled in the art to which it appertains to make and use the same.

This invention relates to gages, and has for its object to provide a gage for use in constructing vehicle-wheels which may be set to mark the spokes of a wheel at the point at which they are to be cut in constructing a wheel of a predetermined size, the gage being adjustable to mark spokes for the construction of wheels of different sizes.

Another object is to provide a device embodying the above features which will also show the size of the hub of the wheel in connection with which it is used.

Other objects and advantages will be apparent from the following description, and it will be understood that changes in the specific construction shown and described may be made within the scope of the claims and that any suitable materials may be used without departing from the spirit of the invention.

In the drawings forming a portion of this specification, and in which like numerals of reference indicate similar parts in the several views, Figure 1 is a view of a wheel with the present invention in use thereupon. Fig. 2 is a section on line 2 2 of Fig. 1. Fig. 3 is a transverse section of the head, taken through the portion 9 of the try-square 10 on the line 3 3 of Fig. 1. Fig. 4 is an enlarged elevation on the gage, showing the figures upon the scale more clearly.

Referring now to the drawings, the present invention comprises a portion having the general shape of a T-square and including a head 5 and a blade 6, extending at right angles thereto. At its opposite side from the blade 6 the head is hollowed, as shown at 7, this hollow following a continuous curve for the reception of a hub of a wheel, as will be presently described. At one side of the blade 6 the head 5 has a transverse passage 8 formed therethrough, in which there is engaged one angular portion 9 of a try-square 10, the other angular portion 11 of which extends parallel to the head 5 at the hollowed side of the latter, and the portion 9 of the try-square is slidable within the passage 8 to bring its portion 11 toward and away from the head 5. The portion 9 has a scale marked thereupon, the marks of which as they pass beyond the head 5 indicate the distance between the portion 11 of the try-square and the innermost point of the hollow 7. As will be seen, the hub of a wheel may be engaged in the hollow 7, and the try-square may then be moved to bring its portion 11 into engagement with the hub, which will prevent disengagement of the hub from the hollow, and it will be understood that the scale of the portion 9 of the try-square will indicate the diameter of the hub. A set-screw 12 is engaged in the head 5 and is arranged for operation to impinge against the try-square to hold the latter against movement in the passage 8.

A slide 13 is engaged on the blade 6 for movement longitudinally thereupon and is provided with a set-screw 14, operable to impinge against the blade to hold the slide at different points of its movement, and upon its under face the slide 13 is provided with a marker 15.

The blade 6 has its upper surface divided into a plurality of longitudinally-extending scales 16, these scales being divided into one-half-inch spaces, which are marked with characters indicating intervals of one inch, so that the characters of the several scales indicate twice the actual length of the scales. Adjacent to the head 5 these several scales are marked with characters at one-half-inch intervals, indicating the diameters of hubs which might be disposed between the head 5 and the portion 11 of the try-square, the characters in the drawings indicating hubs of diameters from four to seven and one-half inches. The just-mentioned characters will be known as "hub-indicating" characters. The characters of the scales 16 are intended to indicate the diameters of wheels which might be constructed upon hubs the diameters of which are indicated by the respective hub-indicating characters of these scales, and it will be observed that the scales 16 terminate some distance from the head 5, the lowest characters of the scales indicating the smallest wheels which might be constructed upon the different hubs. The distance between the inner end of each of these scales and the center of a hub engaged in the hollow 7 and having the size designated by the hub-indicating character at the end of the scale is slightly less than the distance indicated by the innermost character of the scale, the difference between the actual distance and the distance indicated by the character being equal to the thickness of the felly and tire of a wheel between the ends of the spokes and the outer surface of the tire.

In use a hub is disposed within the hollow 7, and the try-square is then moved to bring its portion 11 into engagement with the hub. The character upon the scale of the portion 10 of the try-square which indicates the diameter of the hub is then noted, and the scale 16 which has the hub-indicating character corresponding to the diameter of the hub just ascertained is located. The workman having previously determined the diameter of the wheel to be constructed upon the hub, he locates the character upon the scale 16, which indicates such a diameter, and the slide 13 is then moved to this character, when the marker 15 will lie in position to mark the spokes engaged in the hubs at the points at which they should be cut in constructing a wheel of the diameter determined, it being understood that the marker is so positioned upon the slide that it lies directly beneath the character at which the slide is disposed. It will be readily understood that the gage is revolved upon the hub to mark all of the spokes.

What is claimed is—

1. An instrument of the class described comprising a head, a blade carried by the head and having scales marked thereupon, a slide engaged with the blade for movement longitudinally thereof, a marker carried by the slide and a member slidably engaged in the head and having an angular portion extending parallel to the head at the opposite side thereof to the blade said head and angular portion being adapted for the engagement of a wheel-hub therebetween said member having a scale marked thereupon arranged to indicate the diameter of hubs engaged between the angular portion of the member and the head.

2. An instrument of the class described comprising a head having a hollow in one of its edges, a blade carried by the head and extending beyond the opposite side of the head from the hollow, a try-square disposed with one of its portions slidably engaged in the head at one side of the blade and with its other portion extending parallel to the head at the hollowed side thereof said try-square being movable through the head to bring the second-named portion toward and away from the head, means for holding the try-square at different points of its movement a slide engaged with the blade for movement longitudinally thereof a marker carried by the slide and means for holding the slide at different points of its movement.

3. An instrument of the class described comprising portions movable toward and away from each other and adapted for the reception of a wheel-hub therebetween, means for indicating the diameter of a hub engaged between said portions, a blade carried by one of the portions and having a plurality of scales marked thereupon, a slide engaged with the blade for movement to lie at different points upon the scales and a marker carried by the slide and disposed to mark spokes engaged in a hub disposed between the movably-connected portions, the scales of the blade being arranged to indicate the diameters of wheels and the marker being arranged to mark spokes at the points at which they should be cut for the construction of wheels the diameters of which are indicated by the characters of the scales at which the slide is disposed.

4. An instrument of the class described comprising hub-receiving members adjustable to receive hubs of different sizes means for indicating the diameter of hubs received by the members, a blade carried by one of the members, said blade having a series of scales thereupon arranged to indicate different wheel-diameters and adapted for use in connection with hubs of different diameters and a spoke-marker engaged with the blade and movable to lie at different points of the scales said scales being marked to indicate the diameters of hubs in connection with which they are to be used.

In testimony whereof I affix my signature in presence of two witnesses.

ROBERT L. ERVIN.

Witnesses:
 HENRY TOWENY,
 A. L. BOAZ.